(12) United States Patent
Ito et al.

(10) Patent No.: US 6,388,674 B1
(45) Date of Patent: May 14, 2002

(54) GAMUT MAPPING METHOD AND APPARATUS

(75) Inventors: Masahiko Ito; Naoya Kato, both of Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/315,978

(22) Filed: May 21, 1999

(30) Foreign Application Priority Data

May 28, 1998 (JP) ........................................... 10-148131

(51) Int. Cl.⁷ ................................................. G09G 5/04
(52) U.S. Cl. ...................... 345/590; 345/589; 345/591; 345/600; 382/166; 382/167; 358/519; 358/520
(58) Field of Search ................................. 345/150, 129, 345/130, 127, 133, 154, 425, 426, 431, 186, 507, 509, 199, 202, 6, 22, 83, 84, 589–591, 593, 597, 600, 604; 358/1.9, 502, 504, 518, 519–520; 382/162, 167, 166

(56) References Cited

U.S. PATENT DOCUMENTS

| | | | | | |
|---|---|---|---|---|---|
| 5,416,890 A | * | 5/1995 | Beretta | ......................... | 345/590 |
| H001506 H | * | 12/1995 | Beretta | ......................... | 345/199 |
| H1506 H | * | 12/1995 | Beretta | ......................... | 345/591 |
| 5,510,910 A | * | 4/1996 | Bockman | ..................... | 358/502 |
| 5,712,925 A | | 1/1998 | Ohga | | |
| 5,740,076 A | * | 4/1998 | Lindbloom | .................. | 345/431 |
| 5,748,342 A | * | 5/1998 | Usami | ......................... | 358/500 |
| 5,883,632 A | * | 3/1999 | Dillinger | .................... | 345/431 |
| 5,909,220 A | * | 6/1999 | Sandow | ....................... | 345/431 |
| 5,933,253 A | * | 8/1999 | Ito et al. | ...................... | 358/500 |
| 6,009,192 A | * | 12/1999 | Klassen | ...................... | 382/167 |
| 6,043,909 A | * | 3/2000 | Holub | ......................... | 382/504 |
| 6,097,838 A | * | 8/2000 | Klassen | ...................... | 382/167 |
| 6,128,022 A | * | 10/2000 | Dillinger | .................... | 345/431 |
| 6,157,735 A | * | 12/2000 | Holub | ......................... | 382/167 |

FOREIGN PATENT DOCUMENTS

| | | |
|---|---|---|
| EP | 0 684 728 | 11/1995 |
| EP | 0 828 381 | 3/1998 |

OTHER PUBLICATIONS

M. Ito and N. Katoh: "Gamut Compression for Computer Graphic Images" Extended Abstract SPSTJ 70$^{th}$ Aniverary Symp. Fine Imaging, 1995, pp. 85–88.

Katoh and M Ito N: "Three–dimensional Gamut Mapping Using Various Color Difference Formulae and Color Spaces" Journal of Electronic Imaging, SPIE + IS&T vol. 8, No. 4, Oct. 1999 pp. 365–378.

* cited by examiner

*Primary Examiner*—Matthew Luu
*Assistant Examiner*—Wesner Sajous
(74) *Attorney, Agent, or Firm*—Ronald P. Kananen, Esq.; Rader, Fishman & Grauer, PLLC

(57) ABSTRACT

When an output color gamut is different from an input color gamut in a picture input/output system such as DTP, the color is corrected with a predetermined function for a difference in the lightness-directional dynamic range. A three-dimensional compression is made to compress the color of areas C and D to an area (A+B), and next a two-dimensional compression (or shrinkage) is made to compress the color of the area (B+C) to the area B, for example.

17 Claims, 12 Drawing Sheets

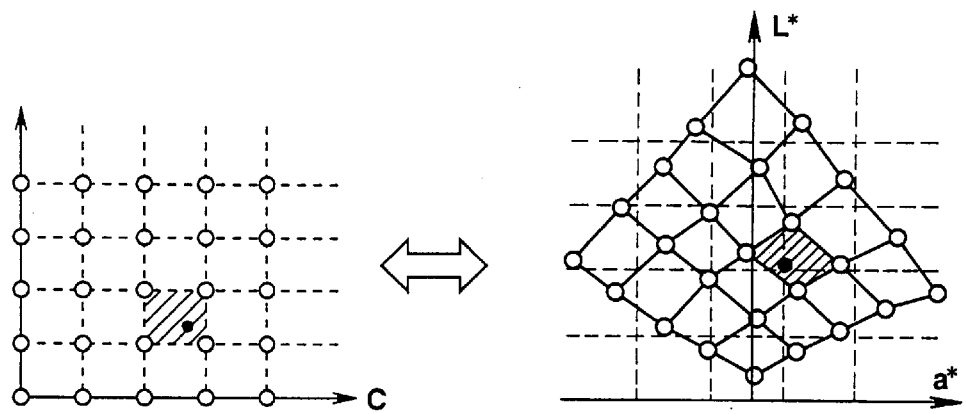
FIG.7A   FIG.7B
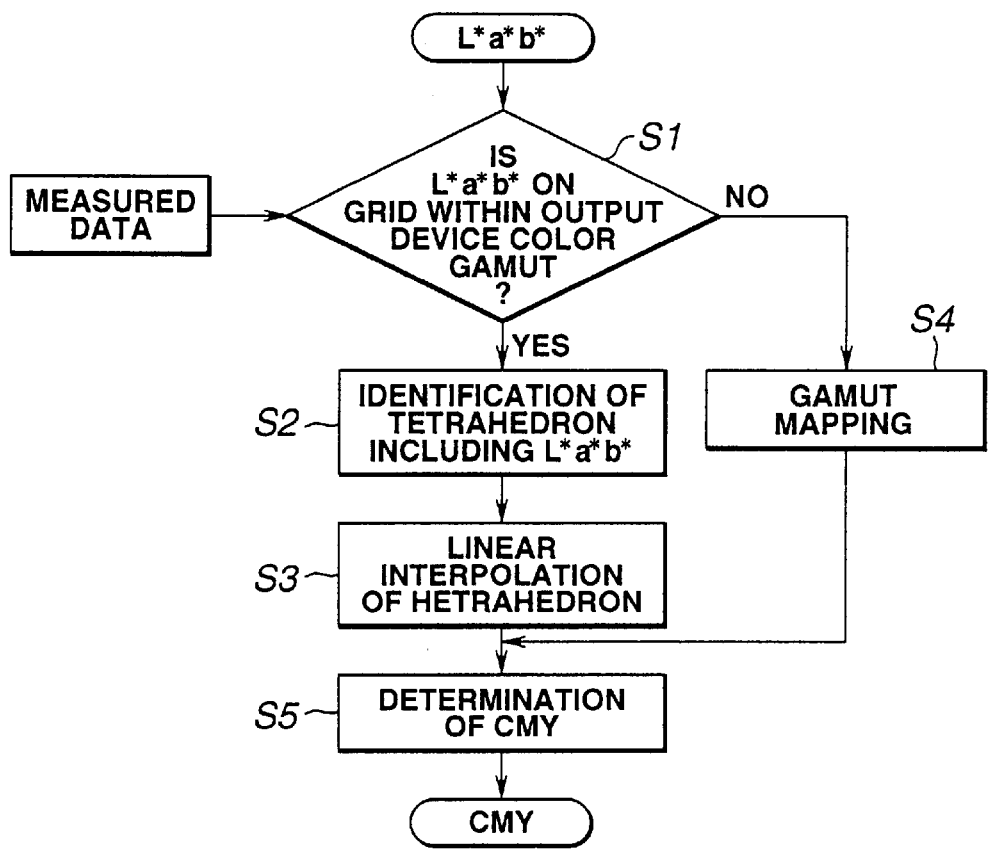
FIG.8

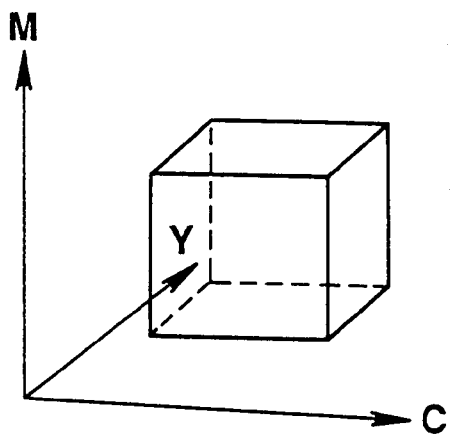
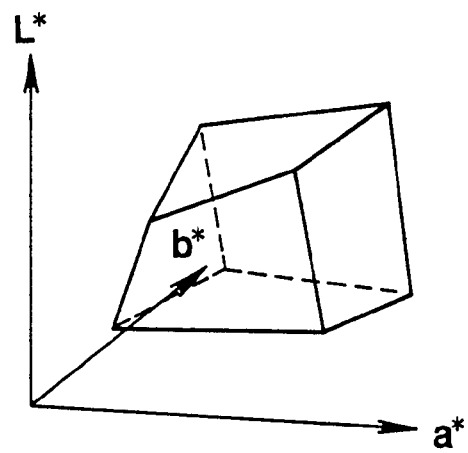
FIG.9A  FIG.9B
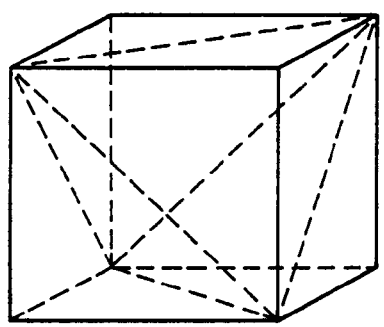
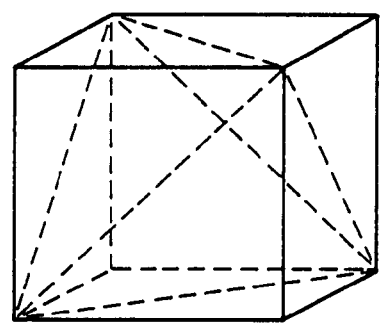
FIG.10A  FIG.10B

P : $(c_P, m_P, y_P)$

P : $(L^*_P, a^*_P, b^*_P)$

GAMUT MAPPING METHOD AND APPARATUS

BACKGROUND OF THE INVENTION

1. Field of the Invention

The present invention relates to a gamut mapping method usable when a color reproduction range (referred to as "color gamut" hereinunder) of an output system is different from that of an input system suitable for use to reproduce by an electronic device of one kind of a color picture data supplied from an electronic device of another kind, both the devices included in a picture input/output system such as a desk top publishing (DTP). The gamut mapping method and apparatus are suitably used in hard copying, by a printer having a small color gamut, of a color picture signal supplied from a monitor whose color gamut is large, for example.

2. Description of Related Art

Recently, with electronic devices having remarkably been innovated for lower prices and higher speeds, color desk top publishing (color DTP) network, internet network, and so forth have been prevailing and a variety of electronic devices dealing with color picture signals (referred to simply as "device" hereinunder) has been incorporated in such network systems. Thus, currently, for a printer to print out a color picture signal supplied from a monitor, for example, it is necessary to introduce the so-called device-independent color (DIC) concept that a color picture from a device of one kind is reproduced in a same color also at a device of another kind, both the devices being included in a picture input/output system.

A system to implement a DIC is generally called a "color management system (CMS)". In the CMS, measured physical values of color signals at an input device are adjusted to those at an output device to implement a DIC. Referring now to FIG. 1, there is schematically illustrated the color management system (CMS) by way of example. The CMS comprises devices such as a video camera 61, monitor 62, printer 63, and so forth. In this CMS, since a color signal of an input or output picture is dependent upon each of the devices, it is necessary to adjust measured physical values of a color signal at the video camera 61 or monitor 62 as an input device to those of a color signal at the printer 63 as an output device.

In the CMS shown in FIG. 1 for example, since a color signal of a picture on the monitor 62 as an input device is an RGB color signal dependent upon the device, an input device profile (monitor profile) created using a predetermined transform formula or table is used to transform the color signal to one independent of the device and further an output device profile (printer profile) is used to transform the device-independent color signal to a one such as CMYK or the like dependent upon the printer 63 as an output device, thereby printing out the picture from the printer 63, as shown in FIG. 2.

Namely, when a color signal is transformed to an output color signal in the CMS, a transform formula or table called "device profile (will be referred to simply as "profile" hereinunder as the case may be) is used to transform the input color signal to a color signal in a color space independent of each device (CIE/XYZ, and so forth), thereby implementing the DIC. The "device profile" may be considered as a file of parameter groups calculated based on a relationship between a color signal (RGB, CMYK, and so forth) of a device and a color measured (XYZ, $L^*a^*b^*$, CIE/$L^*C^*h$, and so forth) by a colorimeter or the like.

However, each input/output device is limited in color reproduction range (gamut), namely, in a color gamut. The color gamut varies greatly from one kind of device to another. Therefore, it has been physically difficult to reproduce a completely same color at all of the different kinds of devices, and especially, the difference in color gamut from one to another kind of device has been a great barrier against implementation of the CMS. This will further be described concerning a computer graphic (CG) monitor and an inkjet printer (referred to simply as "printer" hereinunder).

As well known, the CG monitor reproduces a color by the addition mixture of primary colors emitted from three phosphors, red (R), green (G) and blue (B). Therefore, the color gamut of the CG monitor depends upon the kinds of phosphors used in the CG monitor. On the other hand, the printer reproduces a color with inks of cyan (C), magenta (M), yellow (Y) and black (K). The color gamut of the printer varies from one to another kind of ink as well as from one to another type of paper as a picture recording medium and from one to another gradation reproducing method.

FIG. 3 shows the result of a comparison between a color gamut GMmon of the CG monitor and a color gamut GMijp of the printer, each obtained by integration in the direction of $L^*$ and plotting in a plane of $a^*$-$b^*$. As seen, the color gamut GMijp of the printer is smaller than the color gamut GMmon of the CG monitor. Especially, the G (green) and B (blue) gamuts are very smaller. As seen from FIG. 3, the peak chroma deviates in the direction of lightness also in other areas in which the color gamuts are not so much different. Therefore, when a color displayed on the CG monitor is reproduced by the printer, it is physically different for the printer to reproduce the color in the areas of a high lightness and chroma on the CG monitor.

Thus, when the color gamut of an output device is smaller than that of an input device, all the colors displayed on the input device cannot be reproduced by the output device. Therefore, in such a case, it is necessary to make some operation for compressing the color gamut of the input device into that of the output device. At this time, the color gamut of the input device have to be compressed into that of the output device while maintaining picture information (gradation, tone, and so forth) represented on the input device as much as possible. Namely, the color should be corrected to compress a color outside the color reproduction range (color gamut) into the color gamut while maintaining an input original picture information.

The operation to compress into the color gamut of the output device a color which cannot physically be reproduced is generally called "gamut compression". Taking in consideration a case that the color gamut of the output device is larger than that of the input device, the operation to transform the color gamut of the input device to that of the output device of a different kind from the input device will be referred to as "gamut mapping".

Since the color gamut of a printer as an output device is much smaller than that of other input device, the color reproduction depends greatly upon the method of gamut mapping in many cases. The gamut mapping is done in a common color space not dependent upon any device. It is most popular to effect the gamut mapping in a CIE/$L^*C^*h$ color space matching the human visual characteristics.

The human eyes can perceive three attributes of a color, namely, lightness, chroma and hue. The aforementioned CIE/$L^*C^*h$ is a color space based on these three attributes of color perceivable by the human eyes. The CIE/$L^*C^*h$ is a color space derived from an $L^*a^*b^*$ color space by representing the latter in the font of spherical coordinates in which $L^*$ indicates the lightness, $C^*$ indicates a chroma and h indicates a hue. In the CIE/L*C*h color space, the above three attributes may be handled as independent parameters.

It is generally said that the gamut mapping should preferably be done in a two-dimensional plane of the lightness L* and chroma C* in the CIE/L*C*h space while the hue h is being maintained constant. More particularly, the gamut mapping methods include a chroma compression in which only the chroma C* is compressed while the lightness L* and hue h are being kept constant as shown in FIG. 4, a lightness compression in which the lightness L* is compressed in a direction of (L*, a*, b)=(50, 0, 0) while the hue h is being kept constant as shown in FIG. 5, and other methods. Further, for a gamut mapping by three-dimensional compression of the lightness, chroma and hue h as well, it has been proposed to weight the three color difference items (lightness, chroma and hue differences) (referred to as "coefficient of compressibility" hereinunder) and then map the lightness, chroma and hue in the direction of a minimum color difference.

In the gamut mapping in which the lightness or chroma is compressed with the hue kept constant, such as the lightness or chroma compression, an emphasis has to be put on the compression in the direction of lightness or chroma, which causes the following problems:

If a compression is done in the direction of lightness L*, the contrast is lowered and the entire picture is of less third dimension. When a compression is done in the direction of chroma C*, the picture becomes less vivid and impactful. Therefore, when the gamut mapping is done with the hue kept constant, a picture having a high chroma and third dimension such as a CG (computer graphic) picture will lose its characteristic very much.

To prevent the above as much as possible, the compressions in the direction of lightness L* and C* should be done at reduced ratios, respectively, in a gamut mapping in which the hue h is somewhat changed. To solve this problem, the Inventor of the present invention has disclosed, in the Japanese Published Unexamined Patent Application No. 08-238760, a gamut mapping method in which coefficients of compressibility are assigned to the lightness, chroma and hue differences, respectively, by weighting. This gamut mapping method permits to compress the lightness L*, chroma C* and hue h in a good balance. However, all data outside the gamut are mapped over the gamut with a result that colors compressed in a same direction are all mapped in a same color, so that they lose the gradation.

SUMMARY OF THE INVENTION

Accordingly, the present invention has an object to overcome the above-mentioned drawbacks of the prior art by providing a gamut mapping method and apparatus adapted to attain a natural color reproduction at different kinds of devices in a picture input/output system such as DTP, and so forth.

The above object can be attained by providing a color mapping method of changing, when an output color gamut is different from an input color gamut, the input color gamut to the output color gamut by correcting the color using a predetermined function for a difference in the lightness-directional dynamic range and correcting the color by a combination of a three-dimensional compression of lightness, chroma and hue and a two-dimensional shrinkage or expansion of the lightness and chroma.

In the color mapping method, the predetermined functions are used for color correction against the difference in lightness-directional dynamic range and the gradation in a low lightness of a picture is maintained, thereby permitting to utilize the output device color gamut to the maximum extent. The color correction by the combination of the three-dimensional compression of lightness, chroma and hue and two-dimensional shrinkage or expansion of lightness and chroma, permits to maintain the characteristics of the picture to the maximum extent.

The above object can also be attained by providing a color mapping apparatus comprising a color mapping means for changing, when an output color gamut is different from an input color gamut, a color in the input color gamut to one in the output color gamut by using a color mapping table created by correcting the color using a predetermined function for a difference in the lightness-directional dynamic range, and then correcting the color by a combination of a three-dimensional compression of lightness, chroma and hue and a two-dimensional shrinkage or expansion of the lightness and chroma.

In the color mapping apparatus, the color mapping means uses the color mapping table to change a color in the input color gamut to one in the output color gamut.

The Invention of the present invention has proposed a two-dimensional compression of lightness and chroma (as in the Japanese Published Unexamined Patent Application No. 09-098298) and a three-dimensional compression of lightness, chroma and hue (as in the Japanese Published Unexamined Patent Application No. 08-238760). In the two-dimensional gamut compression, a consideration is given to the gradation in a high chroma area. The three-dimensional gamut compression permits to prevent the contrast of a picture from being lowered and keeps the picture vivid for a third dimension.

The present invention implements a combination of the correction of a lightness-directional deviation due to a difference between input and output devices (one-dimensional gamut mapping in the direction of lightness) and the above-mentioned two methods of gamut compression. Further, the present invention is based on these two methods of gamut compression and a further development of the methods. Therefore, the present invention is applicable for a gamut mapping even when the color gamut of an output device is wider than that of an input device.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 7 shows a comparison between measured data of a color in a CMY space and that in an L*a*b* space;

FIG. 7A showing the measured data in the CMY space while;

FIG. 7B shows the measured data in the L*a*b* space;

FIG. 8 is a flow chart of operations up to creation of a backward LUT based on measured data of a color;

FIG. 9 graphically shows a comparison between a hexahedron placed as $N^3$ pseudo measured data in a CMY space and that in an L*a*b* space;

FIG. 9A showing the hexahedron placed in the CMY space while;

FIG. 9B shows that placed in the L*a*b* space;

FIG. 10 consisting of FIG. 10A through 10B, shows a division of a hexahedron as $N^3$ pseudo measured data of into five tetrahedrons;

DETAILED DESCRIPTION OF THE PREFERRED EMBODIMENTS

The present invention is used for creation of a device profile, image transform to implement a device-independent color (DIC) and for other purposes. The present invention will be described concerning the creation of a device profile by way of example. The device profile refers to a model of look-up table (LUT). However, the gamut mapping method according to the present invention is not limited to the device profile creation but can be used for mapping a color which cannot be reproduced using a physical model, and so forth.

The present invention will be described concerning the gamut mapping method using a CMY output inkjet printer (referred to simply as "printer" hereinunder) as an output device. More particularly, the gamut mapping method according to the present invention is applied for creation of a backward look-up table (LUT) which is to be stored in a ROM (read-only memory) of the printer. That is, when the printer prints out, on a paper, a picture displayed on and supplied from a monitor or the like as an input device, a controller such as a microcomputer maps color signals according to the backward LUT stored in the ROM or the like, so that the picture displayed on the monitor or the like is printed out on the paper in colors within a color gamut of the printer.

Figure 1:
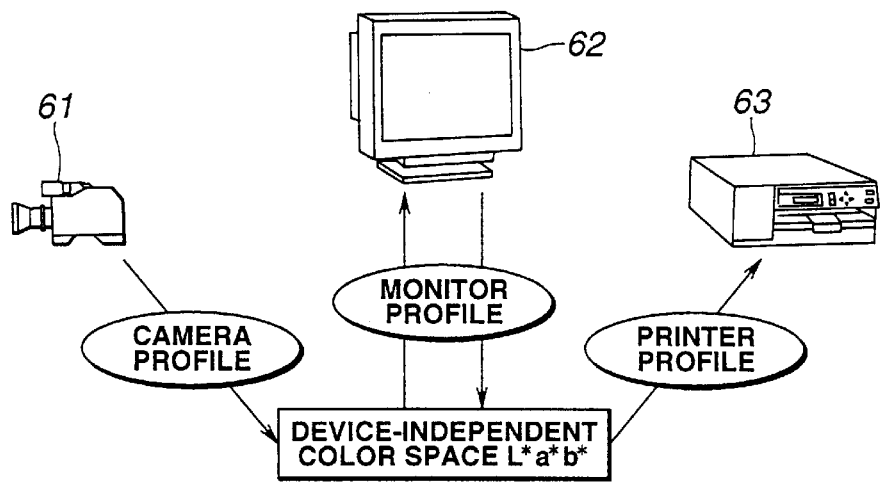
FIG. 1 schematically illustrates a color management system (CMS)
Figure 2:
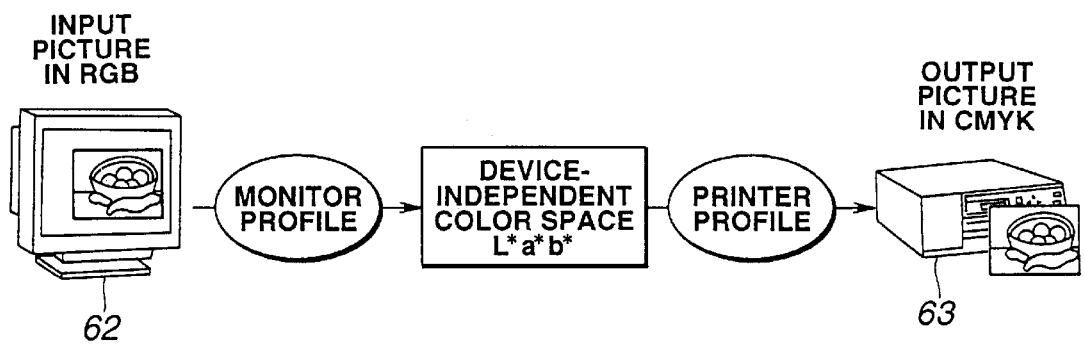
FIG. 2 schematically illustrates a device profile.
Figure 3:
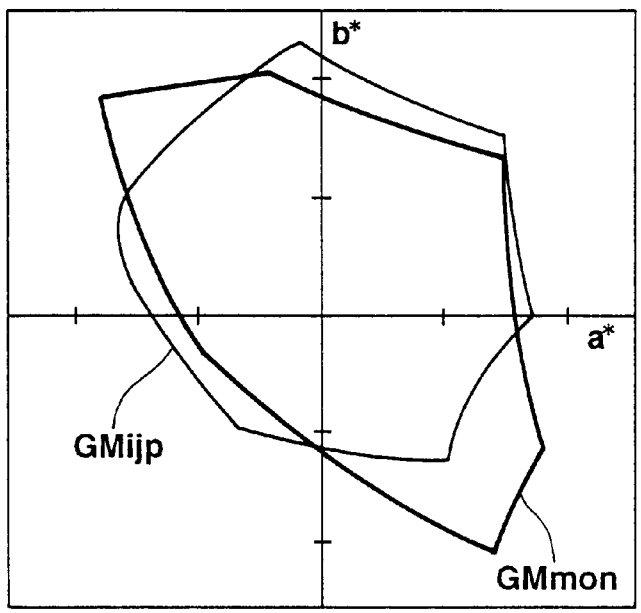
FIG. 3 shows the result of comparison between a color gamut of a CG monitor and a one of an ink-jet printer, each obtained by integration in the direction of L* and plotting in a plane of a*-b*.
Figure 4:
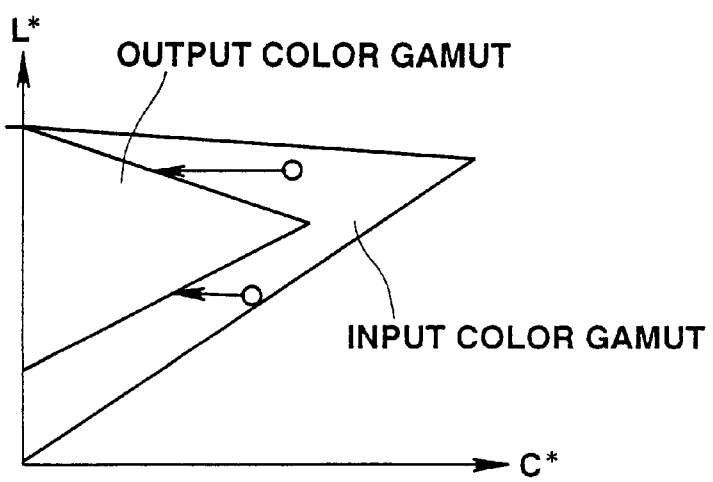
FIG. 4 graphically shows a color gamut mapping in which only chrome is reduced while lightness and hue are maintained constant.
Figure 5:
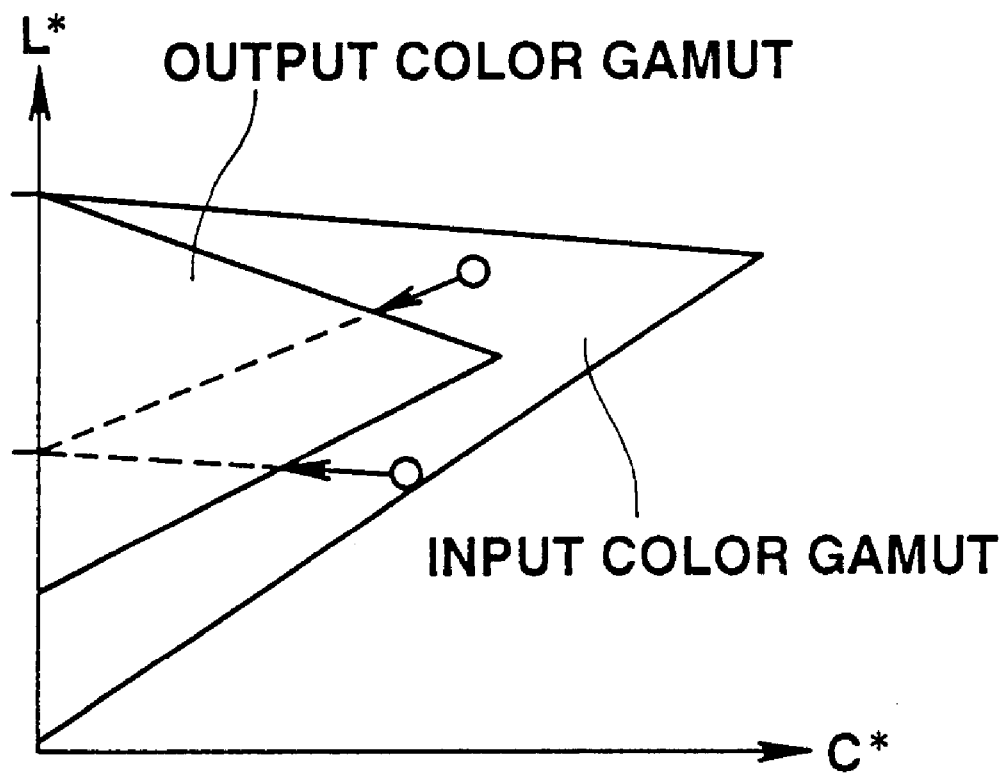
FIG. 5 graphically shows a color gamut mapping with a compression towards (L*, a*, b*)=(50, 0, 0) while hue is maintained constant.
Figure 6:
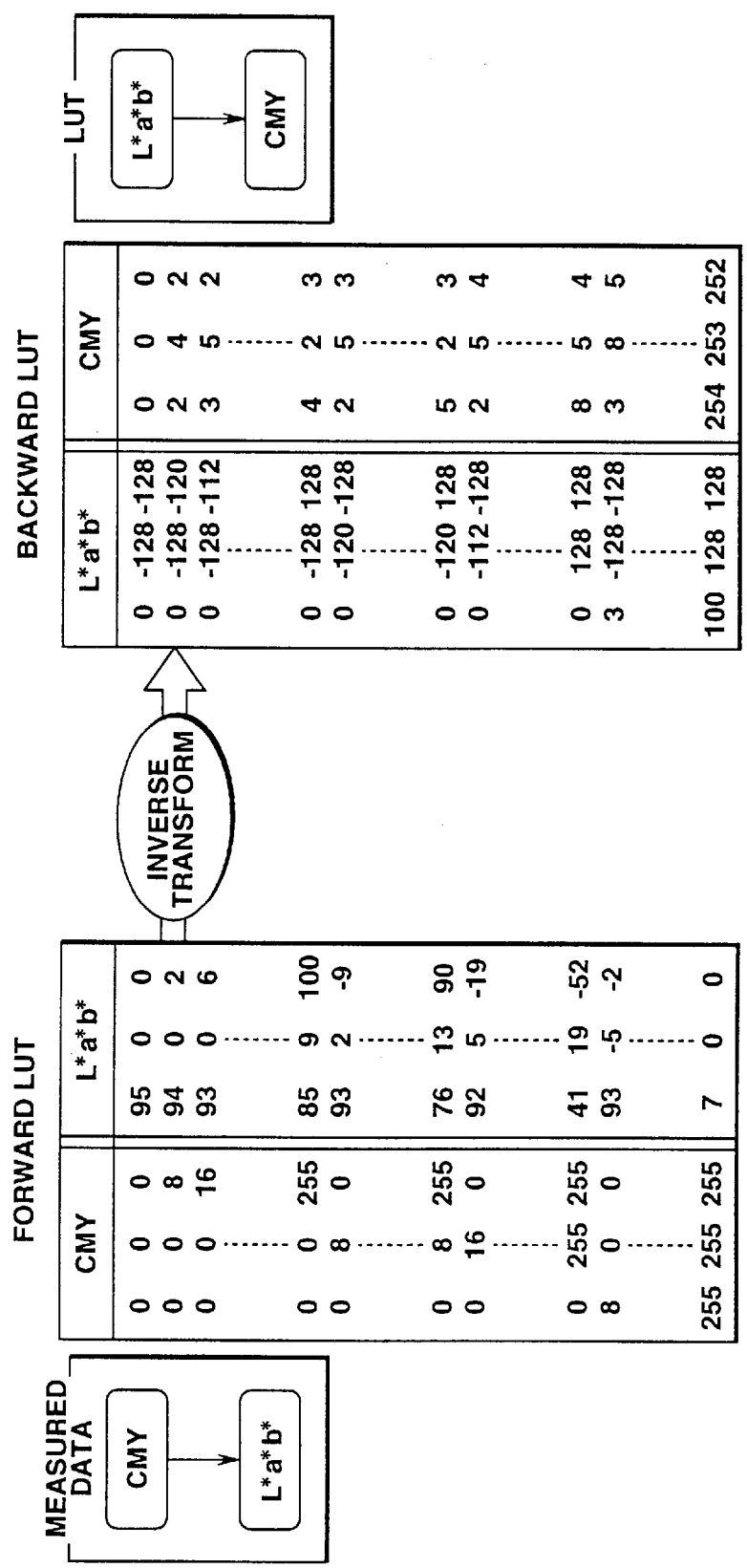
FIG. 6 shows forward and backward look-up tables (LUT), showing a relationship between the LUTs.

To create the above-mentioned backward LUT, it is necessary to create a forward LUT first. Then, LUTs in opposite directions including forward and backward LUTs are created for all the input devices as shown in FIG. 6. The forward LUT is to change a device-dependent color signal (referred to as simply "device signal" hereinunder) to a device-independent color signal (referred to simply as "chroma signal" hereinunder). The backward LUT is to change a chroma signal to a device signal. Note that this embodiment uses a CMY signal as a device signal and an L*a*b* signal as a chroma signal.

To create a backward LUT used to change an L*a*b* signal to a CMY signal, an L*a*b* signal for a CMY signal in a color space of the CMY signal is first calculated to create a forward LUT. Then, a value of L*a*b* signal in a backward LUT for the forward LUT and a value of CMY signal for the L*a*b* signal are calculated by an inverse transform. Finally, a value of CMY signal for the L*a*b* signal not defined in the backward LUT is set using the gamut mapping method according to the present invention.

To create the forward LUT, first a device signal is measured using a spectroscopic colorimeter or the like. More specifically, $N^3$ (N×N×N) color patches are disposed regularly in the CMY space as shown in FIG. 7A. The color value (CIE/L*a*b*) of each patch is measured by the colorimeter. As shown in FIG. 6, the value of each component of the CMY signal and value of L*a*b*, of each patch, are written in the CMY and L*a*b* columns, respectively, in the forward LUT. Namely, the values of each component and L*a*b* are measured data of each color patch supplied from the colorimeter. Note that the color patches may be disposed in any way but they should be disposed to fully fill the device color space. Therefore, if the color patches are disposed not to fully fill the device color space, a forward LUT will be created by an interpolation based on data measured by the colorimeter.

The backward LUT can be created by inverse transform of the forward LUT as shown in FIG. 6. More particularly, when a measured signal is assumed as L*a*b*, for example, $0 \leq L^* \leq 100$, $-128 \leq a^* \leq 128$ and $-128 \leq b^* \leq 128$ are written in the L*a*b* column in the backward LUT as shown in FIG. 6. Namely, an L*a*b* space thus defined is divided by $M^3$ (M×M×M) as shown in FIG. 7B. The backward LUT is a table in which the CMY output values on the grid are stored. For the creation of this backward LUT, a gamut mapping has to be done.

FIG. 8 is a flow chart of operations for the creation of a backward LUT based on data of $N^3$ color patches measured by the calorimeter. As shown in FIG. 7A, the $N^3$ color patches are arranged regularly in the CMY space. However, the data are plotted in the color space L*a*b*, the color patches will be disposed irregularly as shown in FIG. 7B. To create a backward LUT, the L*a*b* space is divided by $M^3$(M×M×M) and the CMY output values on the grid are determined, as mentioned above. However, since it will be seen from FIG. 7 that all the grids are within the a output device color gamut, it is judged at step S1 whether the L*a*b* on the grid is within the output device color gamut as will be described below.

First, $N^3$ measured data are subjected to the Lagrange's interpolation to provide their pseudo measured data. The pseudo measured data is a hexahedron of $(N-1)^3$ as shown in FIGS. 9A and 9B. In the CMY space, the hexahedron is a cube with no distortion as shown in FIG. 9A. In the L*a*b* space, however, it is a distorted hexahedron as shown in FIG. 9B.

Next, the hexahedron is virtually divided into five tetra-hedrons as shown in FIGS. 10A and 10B.

Then, it is judged whether the L*a*b* on the grid is within any of the tetrahedrons, as will be described below.

Figure 11A:
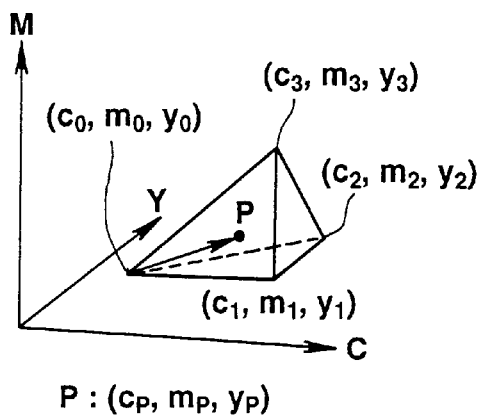
FIG. 11 consisting of FIG. 11A through 11B, graphically shows a calculation to determine in which one of the tetrahedrons formed as in FIG. 10 the L*a*b* on a grid exists.
Figure 11B:
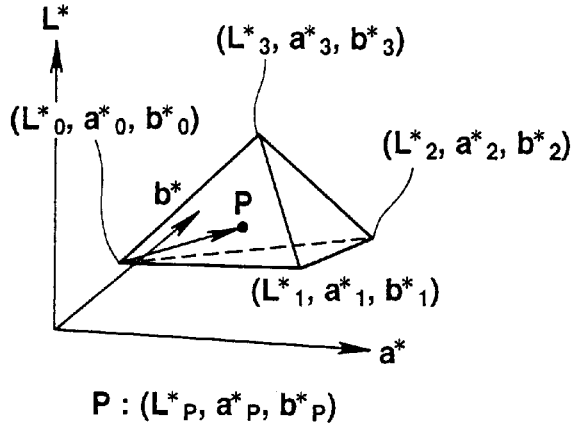

As shown in FIGS. 11A and 11B, it is assumed that an input L*a*b* is a point P (L*P, a*P, b*P) and the coordinate of the apex of one tetrahedron is (L*i, a*i, b*i)(where i=0, 1, 2, 3). The point P can be calculated using the following formula (1):

$$\begin{bmatrix} \alpha \\ \beta \\ \gamma \end{bmatrix} = \begin{bmatrix} L_1^* - L_0^* & L_2^* - L_0^* & L_3^* - L_0^* \\ a_1^* - a_0^* & a_2^* - a_0^* & a_3^* - a_0^* \\ b_1^* - b_0^* & b_1^* - b_0^* & b_1^* - b_0^* \end{bmatrix}^{-1} \cdot \begin{bmatrix} L_P^* - L_0^* \\ a_P^* - a_0^* \\ b_P^* - b_0^* \end{bmatrix} \quad (1)$$

If the $\alpha \geq 0$, $\beta \geq 0$, $\lambda \geq 0$ and $\alpha+\beta+\lambda \leq 1$ satisfy the above formula (1), the point P is included in the tetrahedron. Therefore, when the formula is met in any of the tetrahedrons, the point P (L*a*b*) on the grid is included in the color gamut. Thus, it is determined that L*a*b* on the grid is within the output device. In this case, the controller goes to step S2 to identify a one of the tetrahedrons in which the point P is included, and then goes to step S3.

At step S3, the tetrahedron thus identified is subjected to linear interpolation as in the following to calculate a device signal P (cp, mp, yp) in the CMY space for the color signal P (L*p, a*p, b*p) on the grid. That is, on the assumption that the device signal at each apex of the tetrahedron identified at step S2 is (ci, mi, yi) (where i=0, 1, 2, 3) as shown in FIGS. 11A and 11B, the device signal P (cp, mp, yp) in the CMY space for the color signal P (L*p, a*p, b*p) on the grid can be calculated by a linear interpolation using the following formula (2):

$$\begin{bmatrix} c_P \\ m_P \\ y_P \end{bmatrix} = \begin{bmatrix} c_1 - c_0 & c_2 - c_0 & c_3 - c_o \\ m_1 - m_0 & m_2 - m_0 & m_3 - m_0 \\ y_1 - y_0 & y_1 - y_0 & y_1 - y_0 \end{bmatrix} \cdot \begin{bmatrix} \alpha \\ \beta \\ \gamma \end{bmatrix} + \begin{bmatrix} c_0 \\ m_0 \\ y_0 \end{bmatrix} \quad (2)$$

Therefore, in this case, the values calculated using the above formula (2) are stated in the CMY column of the backward LUT in FIG. 6 at step S5.

On the other hand, if the above formula is not met by any one of the tetrahedrons defined at step S1, the color signal P (L*p, a*p, b*p) of L*a*b* on the grid is outside the color gamut of the output device and thus has to be subjected to a gamut mapping. Therefore, in this case, the gamut mapping is done at step S4 and values calculated by this gamut mapping are stated in the CMY column of the backward LUT in FIG. 6 at next step S5.

In the gamut mapping at step S4, first a color correction is done using a function such as an exponential function to correct a lightness-directional difference. Then, a color correction is done by a combination of a three-dimensional compression of lightness, chroma and hue and a two-dimensional compression of lightness and hue. The one-, two- and three-dimensional compressions will be described in the following:

One-dimensional Compression: Gamut Mapping for Lightness

In the one-dimensional compression, lightness is compressed or expanded with the chroma and hue kept constant to correct a lightness-directional deviation due to a difference between the output and input devices. When the maximum density of the output device is lower than that of the input device, in other words, when the lightness L* of the output device is higher than that of the input device, a black compression will be caused depending a color correction method as the case may be, resulting in a loss of the gradation in low-lightness area. On the contrary, when the maximum density of the output device is higher than that of the input device (i.e., the lightness L* is lower), the color gamut of the output device will not be used to the full extent.

Figure 12:
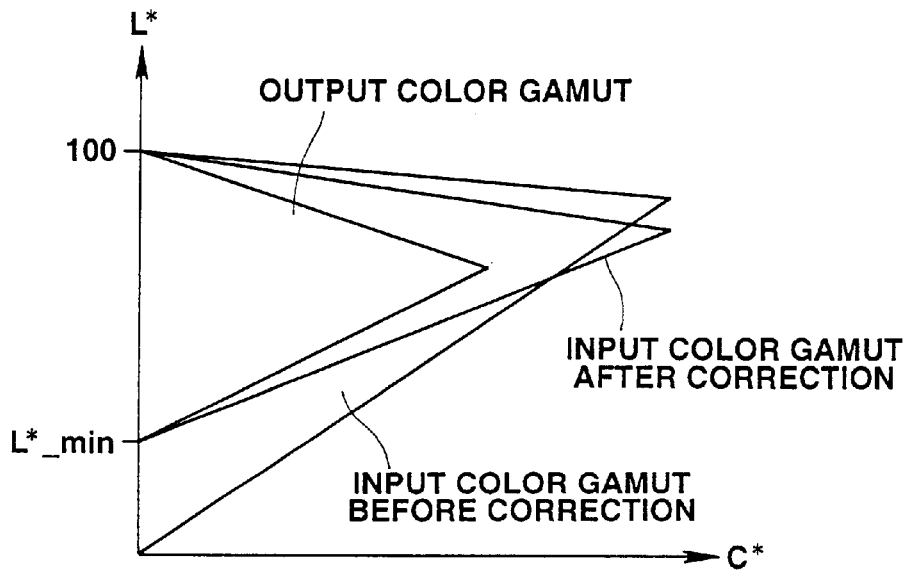
FIG. 12 graphically shows a correction of a deviation in the direction of lightness due to a difference from one to another device.
Figure 13:
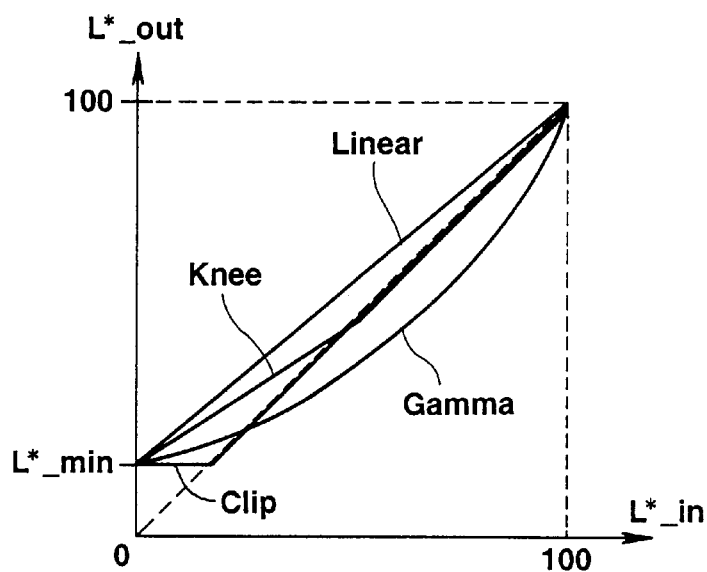
FIG. 13 graphically shows a function used in correcting the lightness-directional deviation.

To solve the above problem, it is necessary to correct a deviation in the direction of lightness as shown in FIG. 12 by effecting some correction. For the correction of the lightness-directional deviation, a variety of functions can be applied as shown in FIG. 13. In this embodiment, however, an exponential function used for correction of a knee and gamma should be used for the correction of the lightness-directional deviation. If an exponential function is used for the one-dimensional compression, the gamut should be mapped to L*_out=(100−L*_min)×(L*_in/100)^γ+L*min where L*in is a lightness before being corrected, L*_in is a lightness after being corrected and L*_out is a lightness after being corrected. When the maximum density of the output device is lower than that of the input device (i.e., the lightness L* is higher), a gamma (γ) value ranging from 1.0 to 1.3 is considered to be suitable and it should be larger as the lightness-directional deviation is larger. On the contrary, when the output device is higher in maximum density than the input device (lightness L* is lower), a gamma value ranging from 0.75 to 1.0 is considered to be suitable and it should be smaller as the lightness-directional deviation is larger. Thus, the lightness-directional deviation between the input and output devices can be corrected to inhibit a phenomenon such as black compression from taking place and maintain the gradation in the low lightness area of a picture, whereby the color gamut of the output device can be used to the full extent.

The compression may be done using the following tristimulus values:

(X_out)=func (X_in)

(Y_out)=func (Y_in)

(Z_out)=func (Z_in)

where A_out=func (A_in) is a function defined by (A_out−Amin_o)/(Amax_o−Amin_o)={(A_in−Amin_i)/(Amax_i−Amin_i)}^γ where Amax_o and Amin_o, and Amax_i and Amin_i represent maximum and minimum values of the respective signals and maximum and minimum values of an input signal.

Also, the following compression may be done by transforming the color signal to tristimulus values linearly variable with the human visual characteristics:

(X_out)$^{1/3}$=func ((X_in)$^{1/3}$)

(Y_out)$^{1/3}$=func ((Y_in)$^{1/3}$)

(Z_out)$^{1/3}$=func ((Z_in)$^{1/3}$)

X, Y and Z are used for tristimulus values but other tristimulus values may be used.

Two-dimensional Compression: Gamut Mapping for Lightness and Chroma

Figure 14:
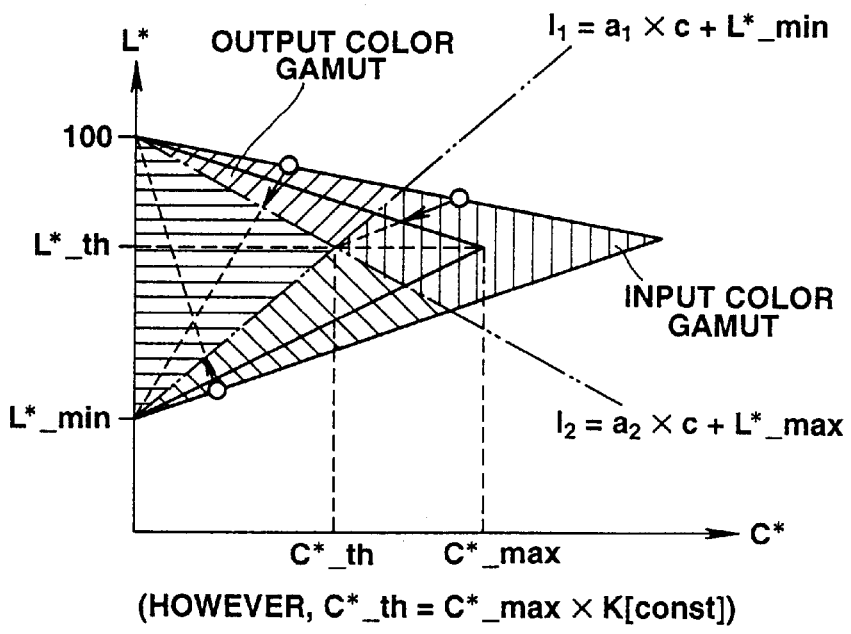
FIG. 14 graphically shows a two-dimensional compression done when an input color gamut is larger than an output color gamut.
Figure 15:
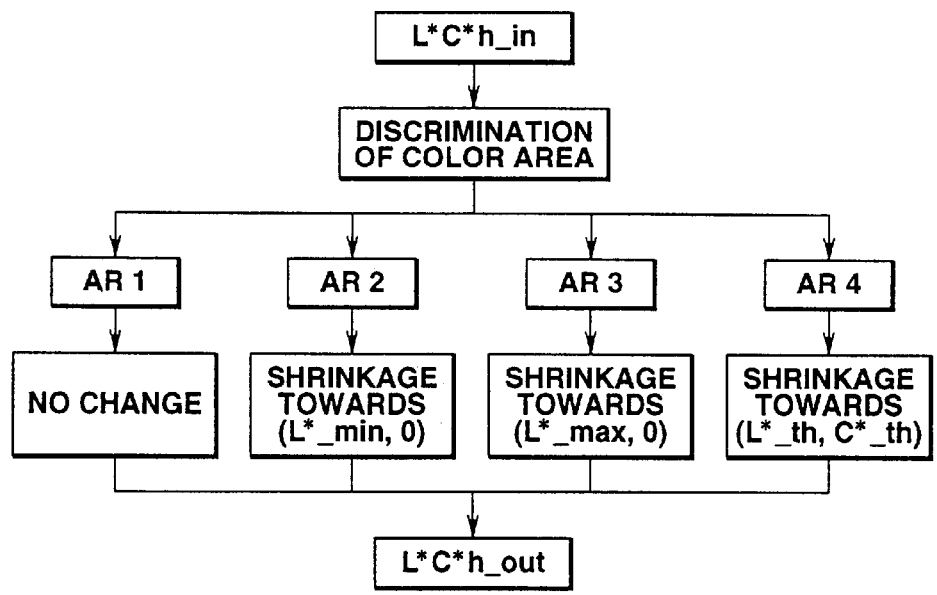
FIG. 15 is a flow chart of operations for the two-dimensional compression done when the input color gamut is larger than the output color gamut as in FIG. 14.
Figure 16:
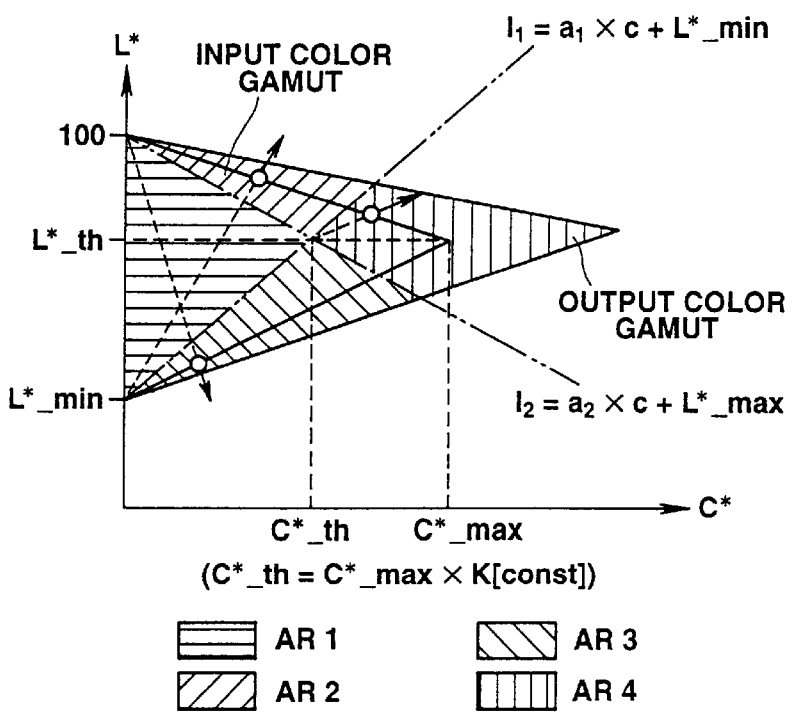
FIG. 16 graphically shows a two-dimensional compression done when an output color gamut is larger than an input color gamut.
Figure 17:
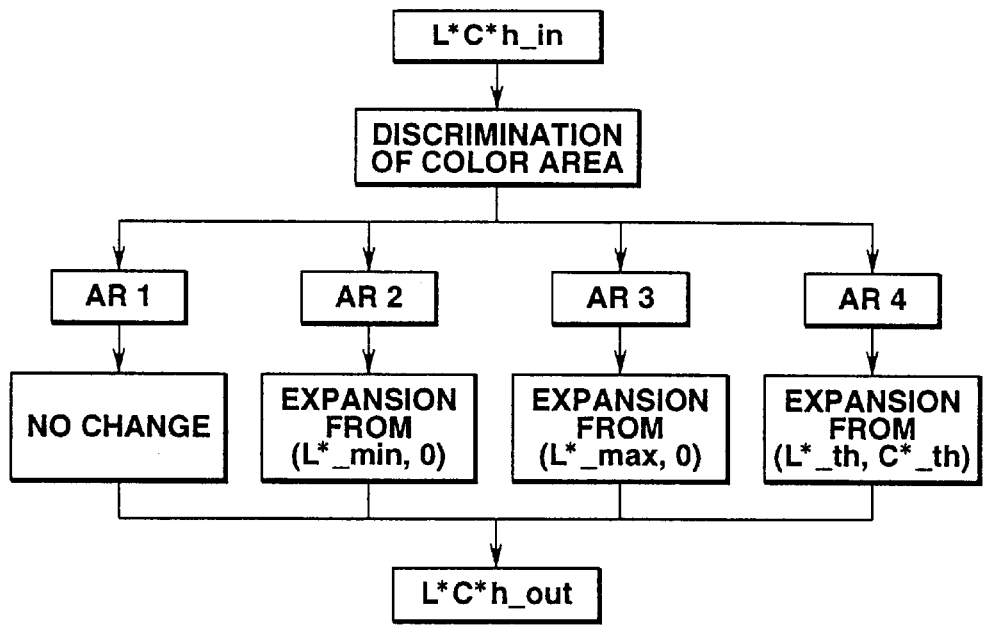
FIG. 17 is a flow chart of operations for the two-dimensional compression done when the input color gamut is larger than the output color gamut as in FIG. 16.

The gamut mapping method according to the present invention is applicable when the color gamut of the output device is smaller than that of the input device as well as when the color gamut of the output device is larger than that of the input device. FIGS. 14 and 15 show a two-dimensional compression to be done when the color gamut of the input device is larger than that of the output device, and FIGS. 16 and 17 show a two-dimensional compression to be done when the color gamut of the output device is larger than that of the input device.

It should be noted that since in an operation done when the color gamut of the output device is smaller than that of the input device, it is expanded to that of the input device, the operation will be referred to as "two-dimensional expansion" herein. Further, it should be noted that since in an operation done when the color gamut of the output device is larger than that of the input device, it is shrunk to that of the input device, the operation will be referred to as "two-dimensional shrinkage" herein. For this two-dimensional expansion or shrinkage, the input gamut is divided by four with a first straight line $1_1$ passing through a minimum value point $L^*\_min$ of the lightness $L^*$ in the output gamut and a second straight line $1_2$ passing through a maximum value point $L^*\_max$ of the lightness $L^*$ in the output gamut, these first and second straight lines intersecting each other at a point ($C^*\_th$, $L^*\_th$) of the lightness value $L^*\_th$ having a maximum chroma value $C^*\_max$ of the output gamut in a two-dimensional plane of the lightness $L^*$ and chroma $C^*$ with the hue h kept constant, as shown in FIGS. 14 and 16.

The two straight lines pass through the maximum value point $L^*\_max$ and minimum value point $L^*\_min$ of the lightness $L^*$ of the output gamut, respectively, and intersect each other at a point. The intersecting point lies on a point ($C^*\_th$, $L^*\_th$) on the lightness $L^*\_th$ having the maximum value of the chroma $C^*\_max$.

The two straight lines can be expressed by the following formulae:

First straight line $1_1$: $a_1 \times C + L^*\_min$

Second straight line $1_2$: $a_2 \times C + L^*\_max$ where $a_1$ and $a_2$ are gradients of the two straight lines, respectively, and $a_1 = (L^*\_th - L^*\_min)/C^*\_th$ and $a_2 = (L^*\_th - L^*\_max)/C^*\_th$. In the above formula, $L^*\_max$ and $L^*\_min$ are maximum and minimum values, respectively, of the output lightness, $C^*\_max$ is the maximum value of the output chroma and $L^*\_th$ is the lightness for the maximum value of the output chroma.

Also, $C^*\_th$ is a parameter defined by $C^*\_th = C^*\_max \times K$ (constant, $0 \leq K \leq 1$).

Therefore, the input color gamut is divided by four as in the following:

First area AR1: $a_1 \times C + L^*\_min \leq 1 \leq a_2 \times C + L^*\_max$

Second area AR2: $1 \geq a_1 \times C + L^*\_min$, $1 \geq a_2 \times C + L^*\_max$ Third area AR3: $1 \leq a_1 \times C + L^*\_min$, $1 \leq a_2 \times C + L^*\_max$ Fourth area AR4: $a_2 \times C + L^*\_max \leq 1 \leq a_1 \times C + L^*\_min$ On the assumption that the value of a color picture data of an input color signal mapped in the CIE/$L^*C^*h$ color space is ($L^*\_in$, $C^*\_in$) and the value the color picture data has after being compressed is ($L^*\_out$, $C^*\_out$), $1 = L^*\_in$ and $c = C^*\_in$ are put in the formulae for the two straight lines to discriminate the area.

If the area is determined to be the first area AR1, the output color gamuts will be the input color gamuts, namely, $L^*\_out = L^*\_in$ and $C^*\_out = C^*\_in$ as shown in FIGS. 15 and 17.

If the area is determined to be the second area AR2, expansion or shrinkage is done on a straight line passing through the point ($L^*\_min$, 0) and ($L^*\_in$, $C^*\_in$). On the assumption that the maximum values of the input and output color gamuts, respectively, on the straight line are ($L^*\_m$, $C^*\_m$) and ($L^*\_p$, $C^*\_p$), respectively, and the value on the boundary between the first and second areas is ($L^*\_tmp$, $C^*\_tmp$), the output gamuts will be as follows:

$L^*\_out = L^*\_tmp + L^*\_in \times (L^*\_p - L^*\_tmp)/(L^*\_m - L^*\_tmp)$ $C^*\_out = C^*\_tmp - C^*\_in \times (C^*\_p - C^*\_tmp)/(C^*\_m - C^*\_tmp)$ If the area is determined to be the third area AR3, expansion or shrinkage is done on a straight line passing through the point ($L^*\_max$, 0) and ($L^*\_in$, $C^*\_in$). On the assumption that the maximum values of the input and output color gamuts, respectively, on the straight line are ($L^*\_m$, $C^*\_m$) and ($L^*\_p$, $C^*\_p$), respectively, and the value on the boundary between the first and second areas is ($L^*\_tmp$, $C^*\_tmp$), the output gamuts will be as follows:

$L^*\_out = L^*\_tmp - L^*\_in \times (L^*\_p - L^*\_tmp)/(L^*\_m - L^*\_tmp)$ $C^*\_out = C^*\_tmp - C^*\_in \times (C^*\_p - C^*\_tmp)/(C^*\_m - C^*\_tmp)$ If the area is determined to be the fourth area AR4, expansion or shrinkage is done on a straight line passing through the point ($L^*\_th$, $C^*\_th$) and ($L^*\_in$, $C^*\_in$). On the assumption that the maximum values of the input and output color gamuts, respectively, on this straight line are ($L^*\_m$, $C^*\_m$) and ($L^*\_p$, $C^*\_p$), respectively, the output gamuts will be as follows:

$L^*\_out = L^*\_th + L^*\_in \times (L^*\_p - L^*\_th)/(L^*\_m - L^*\_th)$ ($L^*\_in > L^*\_th$)

$L^*\_out = L^*\_th - L^*\_in \times (L^*\_p - L^*\_th)/(L^*\_m - L^*\_th)$ ($L^*\_in < L^*\_th$)

$L^*\_out = L^*\_in$ ($L^*\_in = L^*\_th$)

$C^*\_out = C^*\_th - C^*\_in \times (C^*\_p - C^*\_th)/(C^*\_m - C^*\_th)$

With the value of parameter K increased, the change in the direction of chroma can be made smaller. By decreasing the value of parameter K smaller, the change in the direction of lightness can be made smaller. The optimum value for picture output is $0.5 \leq K \leq 1.0$. The parameter K should be large for a printer having a better reproducibility.

Three-dimensional Compression: Compression of Lightness, Chroma and Hue

A visual difference between two colors, which is quantitatively represented, is called a color difference $\Delta E^*_{ab}$ and it can be expressed with the following formula (3):

$$\Delta E = \sqrt{\left(\frac{\Delta L^*}{Kl}\right)^2 + \left(\frac{\Delta C^*_{ab}}{Kc}\right)^2 + \left(\frac{\Delta H^*_{ab}}{Kh}\right)^2} \qquad (3)$$

where $\Delta L^*_{ab}$, $\Delta C^*_{ab}$ and $\Delta H^*_{ab}$ are differences in lightness, chroma and hue between two colors. The smaller the color distance $\Delta E^*_{ab}$, the smaller the visual difference between the two colors will be.

The algorithm employed in the gamut mapping method according to the present invention is such that the three terms (lightness, chroma and hue differences) in the ordinary color difference formula are weighted (the weighting factors are referred to as "coefficient of compressibility" hereinunder) for gamut compression in a direction in which each color difference is minimized. Namely, it is an algorithm for such a color that when the following formula (4) is used to estimate the color differences, the difference $\Delta E$ is minimized.

$$\Delta E^*_{ab} = \sqrt{(\Delta L^*)^2 + (\Delta C^*_{ab})^2 + (\Delta H^*_{ab})^2} \qquad (4)$$

By increasing the values of the coefficients of compressibility Kl, Kc and Kh, the compressibility for the attribute of each term is increased. That is, by changing the coefficient of compressibility, it is possible to find which one of the three attributes is most important and should be compressed. By increasing the value of any one of the three coefficients of compressibility, the compression is made more approximately to the one-dimensional compression. By increasing simultaneously the values of any two of the three coefficients of compressibility, the compression can be made more approximately to the two-dimensional compression. For example, by increasing the coefficient Kl, the compressibility is larger in the direction of lightness while increasing the coefficient Kc will increase the compressibility in the direction of chroma. By increasing simultaneously the coefficients Kl and Kc, the compression is made more approximately to the two-dimensional compression of lightness and chroma with the hue kept as constant as possible. When all the coefficients of compressibility are set to one, the compression is made as represented by the ordinary color difference formula.

The coefficients of compressibility Kl, Kc and Kh are suitably in the following relation:

$$Kc \geq Kh \geq Kl$$

The gamut mapping method according to the present invention is characterized in that the one-dimensional compression for the above-mentioned lightness-directional correction is followed by:

(1) Three-dimensional compression and then two-dimensional compression, or (2) Two-dimensional compression and then three-dimensional compression.

The gamut compressions (1) and (2) will be described below with reference to FIG. 18. The input color gamut is a sum of the areas A, B and C, and the output color gamut is a sum of the areas A and B. The area D is a further area taking place in creating a LUT. When the input device is a monitor, sRGB should preferably be applied.

Figure 18:
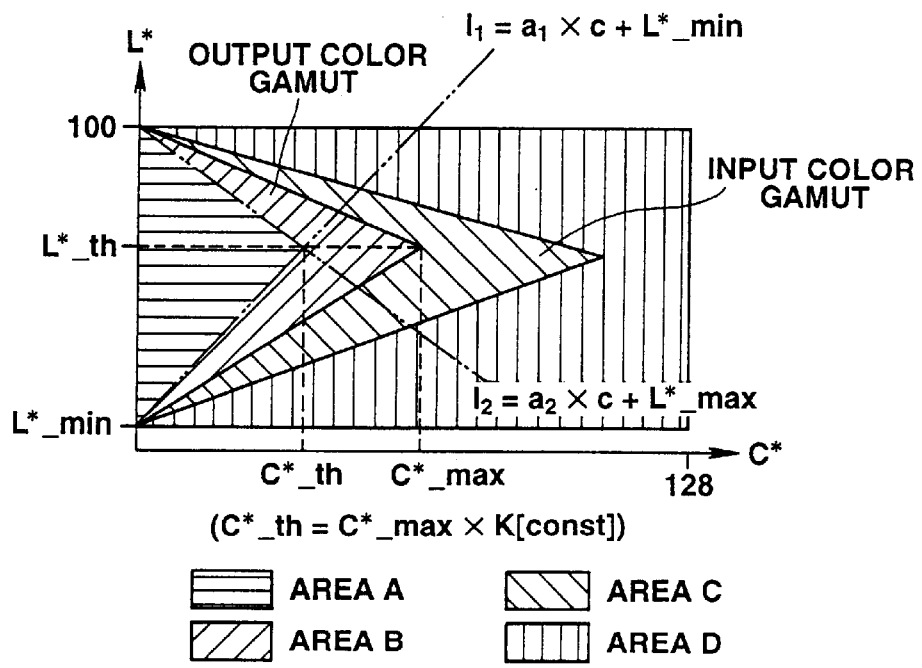
FIG. 18 graphically shows a color correction by a combination of a compression of three-dimensional levels including lightness, chroma and hue and a compression of two-dimensional levels including lightness and chroma.

The areas in FIG. 18 are defined as follows:

Area A: Area above the aforementioned straight line $l_1$ and below the second straight line $l_2$ Area B: An input area other than the area A and corresponding to the output color gamut Area C: An input area other than an area corresponding to the output color gamut Area D: An area other than the output and input color gamuts The gamut mapping (1) in which the three-dimensional compression is done and then the two-dimensional compression is done will be described with reference to FIGS. 19 and 20. In this case, the following two methods had provided good results for reproduction, at a printer, of colors displayed on a monitor.

Figure 19:
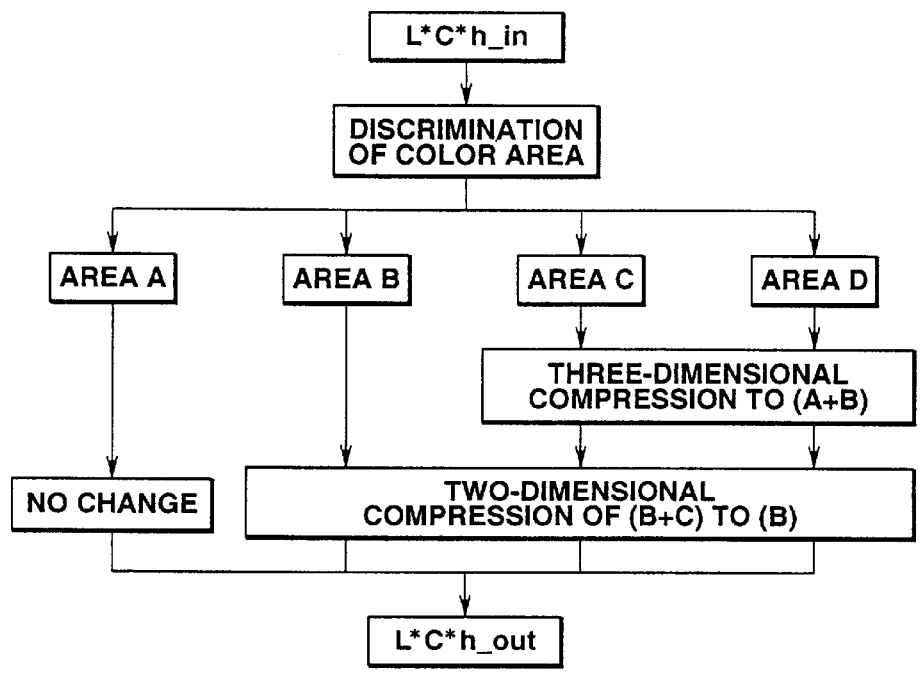
FIG. 19 is a flow chart of operations for a two-dimensional compression done after a three-dimensional compression.

In the first one of the two methods, first the output color gamuts in the areas C and D are three-dimensionally compressed to the area (A+B), and then the area (B+C) is two-dimensionally compressed (shrunk) to the area B as shown in FIG. 19.

Figure 20:
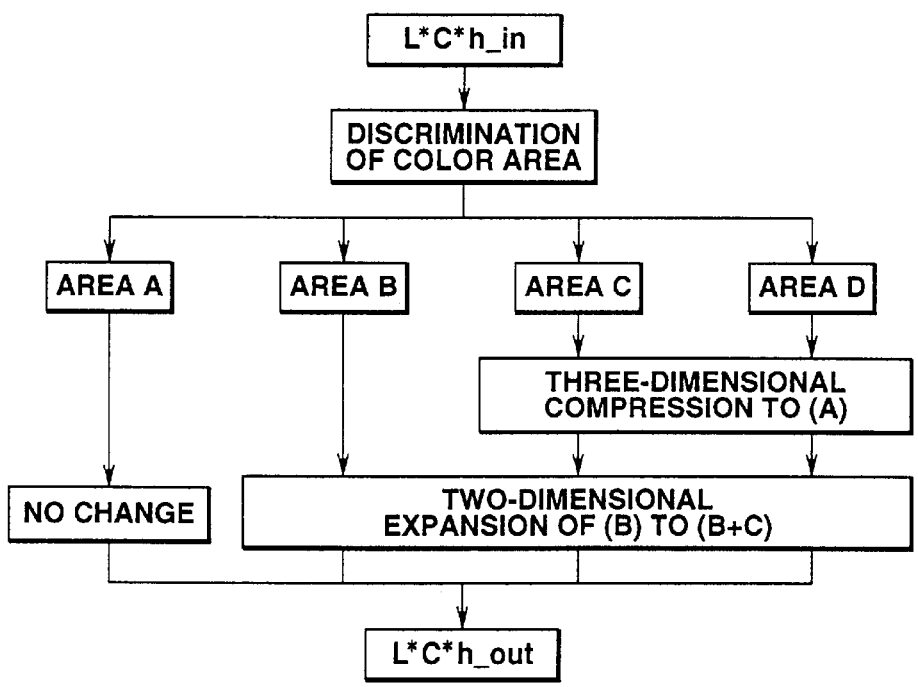
FIG. 20 is a flow chart of operations for a two-dimensional compression done after a three-dimensional compression.

In the second method, first the output color gamuts in the areas B, C and D are three-dimensionally compressed to the area A and then the area A is two-dimensionally compressed (expanded) to the area (B+C) as shown in FIG. 20.

The gamut mapping (2) in which the two-dimensional compression is done and then the three-dimensional compression is done will be described with reference to FIGS. 21 and 22. In this case, the following two methods had provided good results for reproduction, at a printer, of colors displayed on a monitor.

Figure 21:
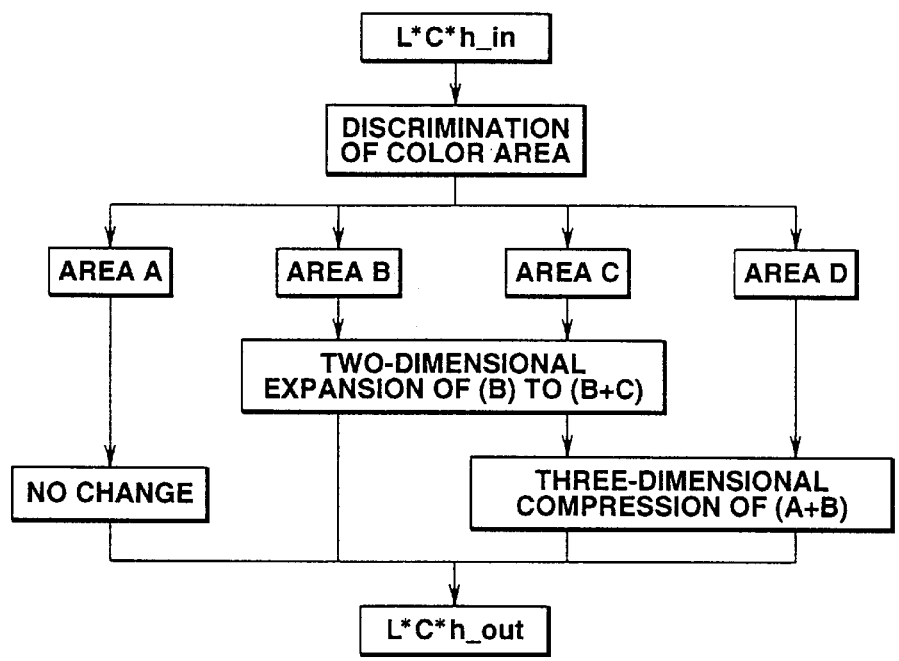
FIG. 21 is a flow chart of operations for a three-dimensional compression done after a two-dimensional compression.

In the first one of the two methods, first the area B is two-dimensionally compressed to the area (B+C) and then the output color gamuts in the areas C and D are three-dimensionally compressed to the area (A+B) as shown in FIG. 21.

Figure 22:
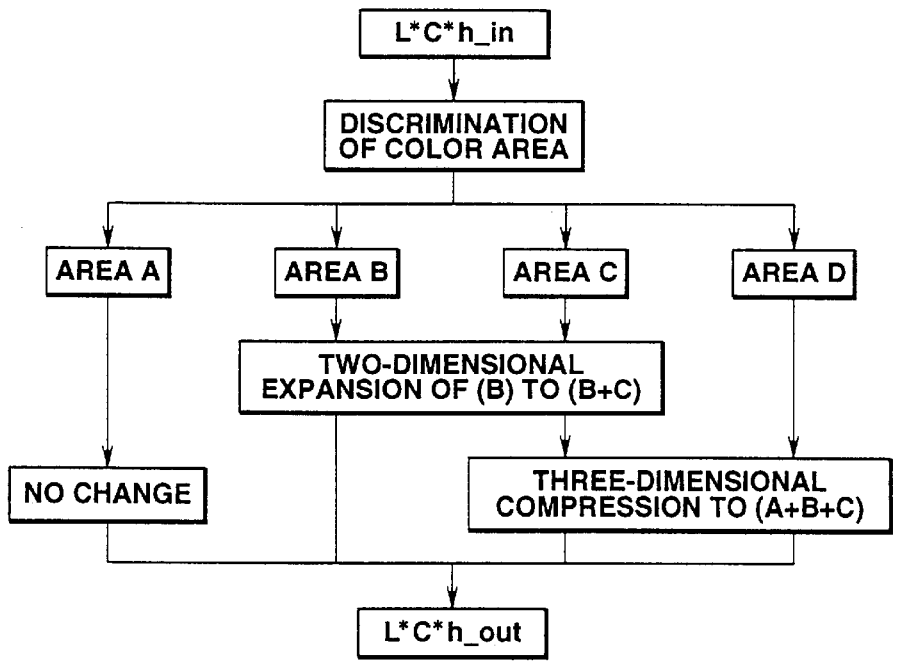
FIG. 22 is a flow chart of operations for a three-dimensional compression done after a two-dimensional compression.

In the second method, first the area B is two-dimensionally compressed (expanded) to the area (B+C) and then the output color gamut in the area D is three-dimensionally compressed to the area (A+B+C) as shown in FIG. 22.

The gamut mapping method having been described in the foregoing transforms a color of a picture to a color signal for each of the weighted three terms in the color difference formula (lightness difference $\Delta L^*$, chroma difference $\Delta C^*_{ab}$ and hue difference $\Delta H^*_{ab}$) to be minimum, thereby permitting to fully keep the characteristics such as contrast, third dimension and vividness of a picture. Also, the method divides a picture into two areas of lightness and chroma with the hue kept constant and compresses each area optimally, thereby permitting to maintain the gradation in an area having a large chroma. Furthermore, the method corrects a lightness-directional deviation between the input and output devices, thereby permitting to prevent a black compression or the like from taking place and keep the gradation of a picture at a low lightness. Thus, the color gamut of the output device can be used to the full extent.

Therefore, even when a color signal outside the output color gamut smaller than the input color gamut is supplied, the gamut mapping method according to the present invention can transform the input color signal to the output color gamut while fully keeping the characteristics such as contrast, third dimension and vividness of a picture. Further, even when the output color gamut is larger than the input color gamut, the gamut mapping method according to the present invention can transform the input color signal to the output color gamut while fully keeping the characteristics such as contrast, third dimension and vividness of a picture.

As having been described in the foregoing, the present invention provides a gamut mapping method of changing, when an output color gamut is different from an input color gamut, the input color gamut to the output color gamut by correcting the color with a predetermined function for a difference in the lightness-directional dynamic range, and correcting the color by a combination of a three-dimensional compression of lightness, chroma and hue and a two-dimensional shrinkage or expansion of the lightness and chroma. Therefore, even when a color signal outside the output color gamut smaller than the input color gamut is supplied, the gamut mapping method according to the present invention can transform the input color signal to the output color gamut while fully keeping the characteristics such as contrast, third dimension and vividness of a picture. Therefore, the present invention permits to provide an output device such as a printer, and so forth, capable of a natural color reproduction at different types of devices in a picture input/output system such as DTP, and so forth.

What is claimed is:

1. A color mapping method of changing a color, when an output color gamut is different from an input color gamut, the input color gamut to the output color gamut, comprising:

correcting the color using a predetermined function for a difference in the lightness-directional dynamic range, and correcting the color by a combination of a three-dimensional compression of lightness, chroma and hue and a two-dimensional shrinkage or expansion of the lightness and chroma, wherein correcting the color further includes:

dividing the input gamut by four with a first straight line passing through a minimum value point L*min of the lightness L* in the output gamut and a second straight line passing through a maximum value point L*max of the lightness L* in the output gamut, these first and second straight lines intersecting each other at a point (C*th, L*_th) of the lightness value L*_th having a maximum chroma value C*_max of the output gamut in a two-dimensional plane of the lightness L* and chroma C* with the hue h kept constant, thereby defining an area A above the first straight line and below the second straight line, an input area B other than the area A and corresponding to the output color gamut, an input area C other than an area corresponding to the output color gamut, and an area D other than the output and input color gamuts; and leaving the color in the area A as it is and correcting the color by a combination of the three-dimensional compression and two-dimensional shrinkage or expansion.

2. The method as set forth in claim 1, further including correcting the color with an exponential function for a difference in the lightness-directional dynamic range.

3. The method as set forth in claim 1, wherein correcting the color by the two-dimensional shrinkage or expansion occurs after the three-dimensional compression.

4. The method as set forth in claim 1, wherein correcting the color by the three-dimensional compression occurs after the two-dimensional expansion.

5. The method as set forth in claim 4, further including subjecting the colors of the areas C and D to the three-dimensional compression to the areas A and B, while subjecting the colors of the areas B and C to the two-dimensional shrinkage to the area B.

6. The method as set forth in claim 4, further including subjecting the colors of the areas B, C and D to the three-dimensional compression to the area A, while subjecting the color of the area B to the two-dimensional compression to the areas B and C.

7. The method as set forth in claim 4, further including subjecting the color of the area B to the two-dimensional expansion, while subjecting the colors of the areas D and C to the three-dimensional compression to the areas A and B.

8. The method as set forth in claim 4, further including subjecting the color of the area B to the two-dimensional expansion to the areas B and C, while subjecting the color of the area D to the three-dimensional compression to the areas A, B and C.

9. The apparatus as set forth in claim 1, wherein said predetermined function is an exponential function.

10. The apparatus as set forth in claim 1, wherein said means causes the two-dimensional shrinkage or expansion to occur after the three-dimensional compression.

11. The apparatus as set forth in claim 1, wherein said means causes the three-dimensional compression to occur after the two-dimensional expansion.

12. A color mapping apparatus comprising:

a color mapping means for changing, when an output color gamut is different from an input color gamut, a color in the input color gamut to one in the output color gamut by using a color mapping table, said color mapping table created by using a predetermined function for a difference in the lightness-directional dynamic range, and then combining a three-dimensional compression of lightness, chroma and hue and a two-dimensional shrinkage or expansion of the lightness and chroma, wherein said means includes means for dividing the input gamut by four with a first straight line passing through a minimum value point L*min of the lightness L* in the output gamut and a second straight line passing through a maximum value point L*max of the lightness L* in the output gamut, these first and second straight lines intersecting each other at a point (C*th, L*_th) of the lightness value L*_th having a maximum chroma value C*_max of the output gamut in a two-dimensional plane of the lightness L* and chroma C* with the hue kept constant, thereby defining an area A above the first straight line and below the second straight line, an input area B other than the area A and corresponding to the output color gamut, an input area C other than an area corresponding to the output color gamut, and an area D other than the output and input color gamuts.

13. The apparatus as set forth in claim 12, wherein said means further leaves the color in the area A as it is and corrects the color by a combination of the three-dimensional compression and two-dimensional shrinkage or expansion.

14. The apparatus as set forth in claim 13, wherein said means further subjects the colors of the area C and D to the three-dimensional compression to the areas A and B, while subjecting the colors of the areas B and C to the two-dimensional shrinkage to the area B.

15. The apparatus as set forth in claim 13, wherein said means further subjects the colors of the areas B, C and D to the three-dimensional compression to the area A, while subjecting the color of the area B to the two-dimensional compression to the areas B and C.

16. The apparatus as set forth in claim 13, wherein said means subjects the color of area B to the two-dimensional expansion, while subjecting the colors of the area D and C to the three-dimensional compression to the areas A and B.

17. The apparatus as set forth in claim 13, wherein said means subjects the color of the area B to the two-dimensional expansion to the areas B and C, while the color of the area D is subjected to the three-dimensional compression to the areas A, B and C.

* * * * *

UNITED STATES PATENT AND TRADEMARK OFFICE
CERTIFICATE OF CORRECTION

PATENT NO.     : 6,388,674 B1                                          Page 1 of 1
DATED          : May 14, 2002
INVENTOR(S)    : Masahiro Ito et al.

It is certified that error appears in the above-identified patent and that said Letters Patent is hereby corrected as shown below:

Column 13,
Lines 56, 61 and 66, "claim 4" should read -- claim 1 --.

Column 14,
Line 3, "claim 4" should read -- claim 1 --.
Lines 8, 10 and 13, "claim 1" should read -- claim 12 --.

Signed and Sealed this

Twenty-fifth Day of October, 2005

JON W. DUDAS
*Director of the United States Patent and Trademark Office*